Feb. 9, 1960

A. R. DIEM 2,924,787

OSCILLATOR

Filed Dec. 6, 1956

INVENTOR.
Albert R. Diem

BY

United States Patent Office 2,924,787

Patented Feb. 9, 1960

2,924,787

OSCILLATOR

Albert R. Diem, Bethesda, Md.

Application December 6, 1956, Serial No. 626,640

4 Claims. (Cl. 331—152)

The invention described herein may be manufactured and used by or for the Government for governmental purposes without the payment to me of any royalty thereon.

The invention relates to oscillators in general and more particularly to astable oscillators.

An astable oscillator is a circuit having two quasi-stable states. The circuit generates a continuous train of pulses and requires no trigger to execute a complete cycle. The well known free-running multivibrator is an example of an astable oscillator.

The invention may be briefly summarized as an astable oscillator having a multi-element electron tube connected to operate as two interleaved triodes sharing a common cathode current, the two triodes being connected for astable operation. The single-tube astable oscillator, besides being simple and compact, has a high order of frequency stability. In addition, the pulses produced can be conveniently varied in frequency and symmetry over a wide frequency range. Neither the free-running multivibrator nor any other astable oscillator of the prior art has the advantages of the astable oscillator herein disclosed.

An object of the present invention is to provide a simple and compact single-tube astable oscillator.

Another object of this invention is to provide a single-tube astable oscillator having a high degree of frequency stability.

A further object of the invention is to provide a single-tube astable oscillator having a high degree of frequency stability which can be conveniently varied in frequency and symmetry over a wide frequency range.

Still another object is to provide a single-tube astable oscillator having a high degree of frequency stability which can be conveniently varied in frequency and symmetry, control of one being independent of the other.

The specific nature of the invention, as well as other objects, uses and advantages thereof, will clearly appear from the following description and from the accompanying drawing in which.

Figure 1:
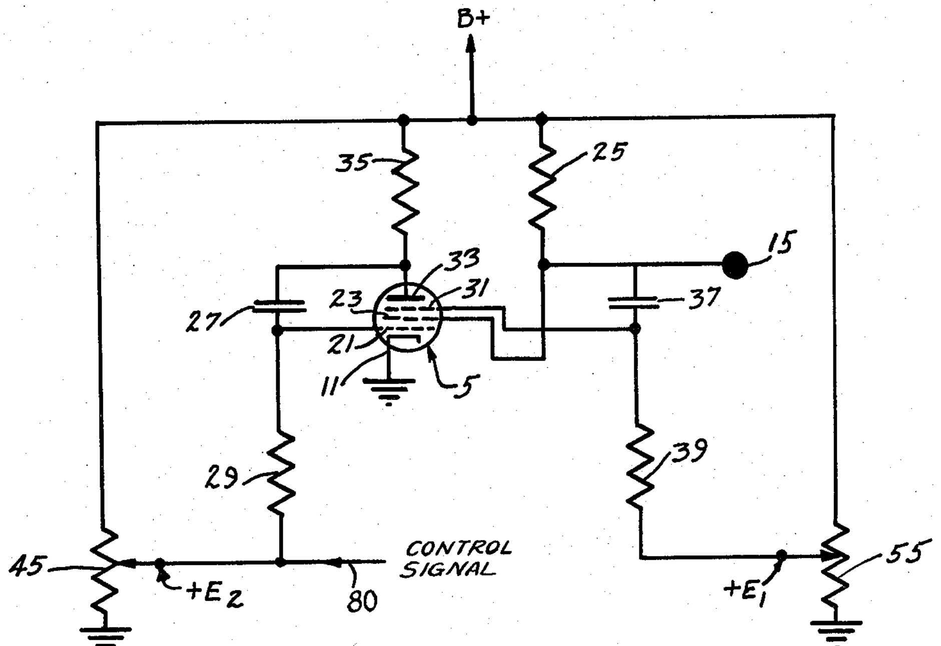
Figure 1 is a circuit diagram of an astable oscillator circuit in accordance with the invention.

Figure 1 shows an electron tube 5 having plate 33, cathode 11, control grid 21, screen grid 23 and suppressor grid 31 elements. A resistor 25 is connected between the screen grid 23 and a source of direct current B+ voltage; the grounded cathode 11, control grid 21, and screen grid 23 elements along with the resistor 25 operate as a first triode. A resistor 35 is connected between the plate 33 and the B+ voltage source; the grounded cathode 11, suppressor grid 31 and plate 33 along with the resistor 35 operate as a second triode.

Astable operation of the first and second triodes is provided in a way analogous to the method used in the well known plate-coupled free-running multivibrator, a capacitor 37 being connected between the screen grid 23 and the suppressor grid 31, and a capacitor 27 being connected between the plate 33 and the control grid 21. Bias is supplied to the grids of the two interleaved triodes by connecting a resistor 29 between a $+E_2$ voltage tap on a potentiometer 45 and the control grid 21, and connecting a resistor 39 between a $+E_1$ voltage tap on a potentiometer 55 and the suppressor grid 31.

The circuit of Figure 1 operates as two interleaved triodes sharing a common cathode, the triodes being connected for astable operation. Considered in this way, the circuit has an appearance and operation quite similar to the well known free-running plate-coupled multivibrator, yet in several ways the operation is quite different. These ways will become apparent from the further description.

The operation of the circuit may be explained as follows:

Assume that initially the first triode is conducting; that is assume that suppressor grid 31 is negative so that almost all of the cathode current flows to the screen grid 23, there being negligible current flowing to the plate 33. As capacitor 37 discharges, the voltage on the suppressor grid 31 approaches $+E_1$. At some positive voltage, the suppressor grid 31 begins to draw some of the cathode current to the plate 33, reducing the current to the screen grid 23 and causing a rise in the voltage on the screen grid 23. Since the screen grid 23 is coupled to the suppressor grid 31 by the capacitor 37, the suppressor grid 31 becomes more positive and, because the action is regenerative, the cathode current abruptly transfers to the plate 33. That is, the first triode ceases conducting and triggers the second triode into conduction. This part of the cycle is similar to what occurs in the plate-coupled free-running multivibrator.

As the second triode conducts, the voltage on the plate 33 begins to fall, but because the plate 33 is coupled to the control grid 21, the voltage on the plate cannot fall abruptly, the fall of the voltage on the plate 33 being determined by the "Miller effect" which will be understood by those skilled in the electronic art. The operation of the second triode therefore has a greater similarity to the operation of a screen-coupled phantastron than to the operation of a plate-coupled free-running multivibrator. When the voltage on the plate 33 "bottoms," that is, drops to a value which is insufficient to maintain current flow to the plate 33, the current to the screen grid 23 increases, reducing the voltage on the screen grid. Since the screen grid 23 is coupled to the suppressor grid 31 by the capacitor 37, the suppressor grid 31 becomes more negative and, because the action is regenerative, the cathode current abruptly transfers to the screen grid 23 and a negative voltage appears on the suppressor grid 31 returning the circuit to the previously assumed initial conditions. That is, the second triode ceases conducting and triggers the first triode into conduction. The cycle then repeats, the operation being periodic, thereby producing square waves at terminal 15.

As is apparent from the drawing and the above description, the capacitor 37 charges up while the first triode is conducting and the capacitor 27 charges up while the second triode is conducting.

The interleaved triodes are connected analogous to a plate-coupled free-running multivibrator, but because the control grid 21 controls the plate 33 as well as the screen grid 23, the unique effect of an astable oscillator having one cycle operating as in a multivibrator and the other cycle operating as in a phantastron results.

From the above description, those skilled in the art will readily be able to provide particular values for the above-described circuit. Utilizing a 6AS6 vacuum tube for the tube 5, typical values are as follows: B+ voltage, 150 volts; resistor 35, 200,000 ohms; resistor 25, 50,000 ohms; resistors 29 and 39, each 68,000 ohms; capacitor 27, 150,000 micromicrofarads; capacitor 37, 470 micromicrofarads; and $+E_1$ and $+E_2$, each 10 volts. These values produce a symmetrical wave at the output terminal 15 with a frequency of 15 kilocycles.

As will be apparent to those skilled in the art, variation of one or more of the resistor, capacitor, voltage supply or bias source components, produces corresponding variations in the frequency and symmetry of the square wave pulses at terminal 15. These variations in frequency and symmetry can be obtained over a wide frequency range. By symmetry of the pulses is meant the conduction time of one triode in relation to the conduction time of the other triode. A pulse is symmetrical when both triodes have the same conduction time so that the square wave is symmetrical. Although control of frequency and symmetry can be obtained by varying any or a combination of the components, the circuit of Figure 1 uses the potentiometers 45 and 55 to obtain control. Each potentiometer controls the conduction time of one of the triodes.

The potentiometers 45 and 55 also provide a high order of stability because variations in the supply voltage B+ produce compensating changes in the bias voltages $+E_1$ and $+E_2$. One might expect that an increase in the B+ voltage supply would increase the conduction times of both triodes causing a reduction in frequency. However, because the bias voltages $+E_1$ and $+E_2$ are derived from potentiometers 55 and 45 connected between B+ and ground, an increase in the B+ voltage also increases the bias voltages $+E_1$ and $+E_2$, the increase in the bias voltages $+E_1$ and $+E_2$ acting to reduce the conduction times of both triodes. Therefore, because an increase in the B+ supply voltage is balanced by an increase in the bias source, no change in frequency or symmetry results. Similar compensation occurs for changes in heater voltage.

Figure 2:
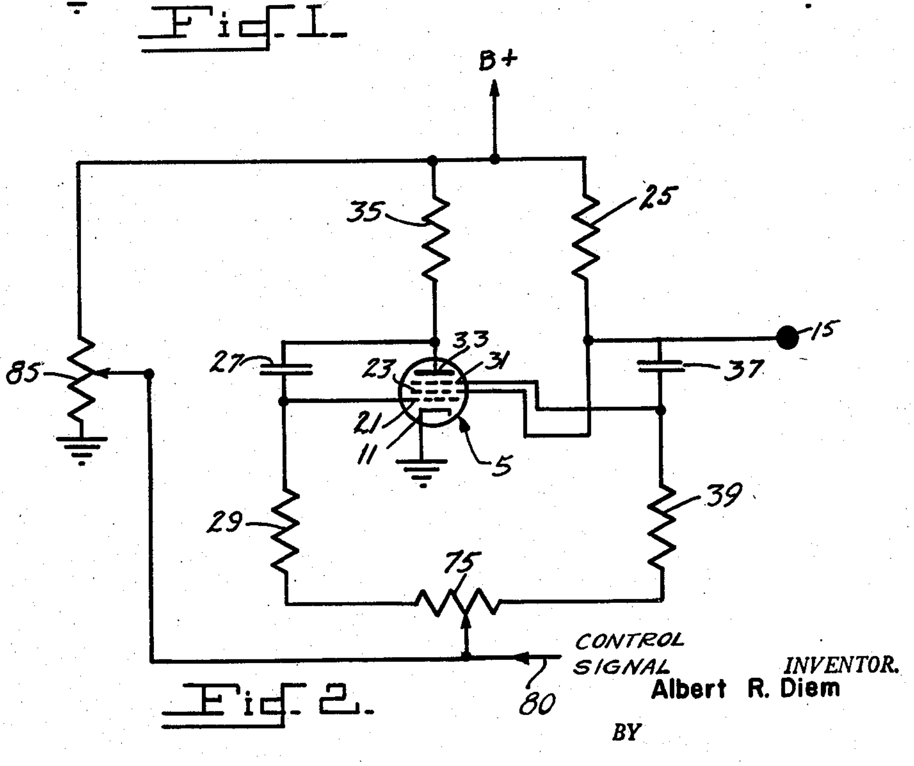
Figure 2 is a circuit diagram of an astable oscillator having modified frequency and symmetry control means.

Figure 2 shows an astable oscillator having a modified form of frequency and symmetry control. Instead of returning resistors 29 and 39 to the separate potentiometers 45 and 55 as in Figure 1, these resistors, in the Figure 2 arrangement, are returned to the opposite ends of a single potentiometer 75. A second potentiometer 85, having its ends connected between the B+ voltage supply and ground has its variable arm connected to the variable arm of potentiometer 75. This arrangement provides for frequency control by potentiometer 85 and symmetry control by potentiometer 75, the two controls operating independently without affecting one another. The frequency control potentiometer 85 varies the bias applied to the grid of each triode so that the conduction time of each triode varies by the same amount and in the same direction, the frequency thus being varied while the symmetry remains constant. The symmetry control potentiometer 75 varies the bias applied to the grid of each triode so that the conduction time of each triode varies by the same amount, but in opposite directions, the symmetry thus being varied while the frequency remains constant. Those skilled in the art will easily be able to choose circuit component values to provide virtually independent control of symmetry and frequency.

It will be apparent that the embodiments shown are only exemplary and that various modifications can be made in construction and arrangement within the scope of the invention as defined in the appended claims.

Skilled persons will readily understand, in the light of what has been said above, that the frequency and/or symmetry of the signals generated by circuits in accordance with my invention may be varied by the injection of control signals from various sources such as is shown by 80 in Figs. 1 and 2. Also, control signals may be substituted for the potentiometers shown, for example. A particularly useful application of my invention is in the field of telemetry; a signal to be telemetered may be substituted for one of the potentiometers, so that the frequency and/or symmetry of the signal generated by the circuit becomes a measure of the amplitude of the telemetered signal.

I claim:

1. An astable oscillator having improved stability and independent frequency and symmetry controls, said oscillator comprising in combination: an electron tube having at least plate, cathode, control grid, screen grid and suppressor grid elements; a source of direct current B+ voltage; a first resistor connected between said screen grid and said source; a second resistor connected between said plate and said source; a first capacitor connected between said screen grid and said suppressor grid; a second capacitor connected between said plate and said control grid; a symmetry control potentiometer; a third resistor connected between said suppressor grid and one end of said symetry control potentiometer; a fourth resistor connected between said control grid and the other end of said symmetry control potentiometer; and a frequency control potentiometer having its ends connected between said voltage supply and ground, the variable arm of said frequency control potentiometer connected to the variable arm of said symmetry control potentiometer; the cathode current of said tube flowing substantially to said screen grid when the voltage on said suppressor grid is more negative than a predetermined value, said suppressor grid becoming more positive as said first capacitor discharges through said first and third resistors, said first capacitor causing the cathode current to regeneratively switch to said plate when the voltage on said suppressor grid reaches said predetermined value, said second capacitor thereupon causing a "Miller" rundown of the voltage on said plate, said first capacitor upon the "bottoming" of the voltage on said plate, causing the cathode current to regeneratively switch back to said screen grid, the cycle thereupon continuing periodically, thereby producing square waves at said screen grid, independent frequency control of said square waves being provided by said frequency control potentiometer, and independent symmetry control of said square waves being provided by said symmetry control potentiometer.

2. The invention in accordance with claim 1, there being additionally provided: means for injecting a control signal to said oscillator so as to vary said square waves in accordance with said signal.

3. An astable oscillator comprising in combination: an electron tube having at least plate, cathode, control grid, screen grid, and suppressor grid elements; a source of direct current voltage; a first resistor connected between said screen grid and said source; a second resistor connected between said plate and said source; a first capacitor connected between said screen grid and said suppressor grid; a second capacitor connected between said plate and said control grid; a resistance means; a third resistor connected between said suppressor grid and one side of said resistance means; a fourth resistor connected between said control grid and the other side of said resistance means; a bias voltage source derived from said source of direct current voltage so that the bias voltage source varies in proportion to any variation in said source of direct current voltage, said bias voltage source being applied to said resistance means at a point intermediate the ends thereof; means for varying the voltage of said bias voltage source; and means for varying the point intermediate the ends of said resistance means at which said bias voltage source is applied; the cathode current of said tube flowing substantially to said screen grid when the voltage on said suppressor grid is more negative than a predetermined value, said suppressor grid then becoming more positive as said first capacitor discharges through said first and third resistors, said first capacitor causing the cathode current to regeneratively switch to said plate when the voltage on said suppressor grid reaches said predetermined value, said second capacitor thereupon causing a "Miller" rundown of the voltage on said plate, said first capacitor upon the "bottoming" of the voltage on said plate, causing the cathode current to regeneratively switch back to said screen grid, the cycle thereupon continuing periodically, thereby producing square waves at said screen grid, the variation of said last two means respectively varying the frequency and symmetry of said square waves.

4. The invention in accordance with claim 3, there being additionally provided: means for injecting a control signal to vary the voltage applied to said point intermediate the ends of said resistance means in accordance with said signal, said square waves thereby also varying in accordance with said signal.

References Cited in the file of this patent

UNITED STATES PATENTS

| | | |
|---|---|---|
| 2,172,746 | Young | Sept. 12, 1939 |
| 2,412,485 | Whiteley | Dec. 10, 1946 |
| 2,456,029 | Snyder | Dec. 14, 1948 |
| 2,870,411 | Wagner | Jan. 20, 1959 |